Aug. 26, 1969 W. D. McCOY 3,463,938

LOW DISTORTION WIDE DYNAMIC RANGE PHASE DETECTOR

Filed May 13, 1966

INVENTOR.
WILLIAM D. McCOY
BY [signature]
ATTORNEY

United States Patent Office 3,463,938
Patented Aug. 26, 1969

3,463,938
LOW DISTORTION WIDE DYNAMIC RANGE PHASE DETECTOR

William D. McCoy, Garland, Tex., assignor to Collins Radio Company, Cedar Rapids, Iowa, a corporation of Iowa Filed May 13, 1966, Ser. No. 549,943
Int. Cl. H03k *5/20*
U.S. Cl. 307—232 2 Claims

ABSTRACT OF THE DISCLOSURE

A phase detector with a transformer receiving one signal input and a transistor receiving a trigger signal input establishing a reference to ground for the transformer secondary and a capacitor charging path for attaining a DC integrating output through charging of the capacitor during each trigger pulse signal to the average voltage of the signal of the secondary through the intervals of the trigger signal pulses. Back to back Zener diodes across the transformer secondary and a resistor in series therewith both limit voltage excursion in the secondary signal developed and also protectively limit voltage levels imposed on the transistor to the voltage drop through the two back to back Zener diodes above the instantaneous voltage value charge level of the capacitor at any such particular time.

This invention relates in general to a phase detector and in particular to a phase detector which is relatively free from offset due to saturation and which has high reliability.

A feature of this invention is found in the provision for a phase detector with a planar transistor connected across the filter circuit.

An object of this invention is to provide a phase detector which has high efficiency and which is capable of operating narrow bandwidth.

Another object of the invention is to provide a phase detector of high reliability.

Further objects, features, and advantages of this invention will become apparent from the following description and claims when read in view of the accompanying drawings, in which:

Figure 1:
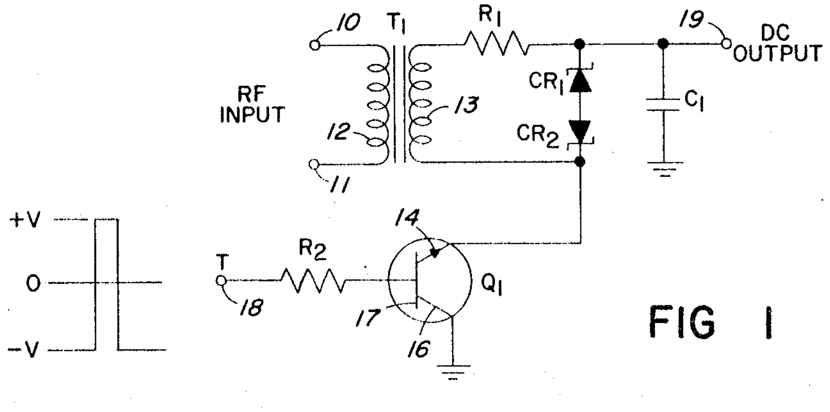
FIGURE 1 is a schematic of the detector of this invention.

FIGURE 1 illustrates a phase detector which comprises a pair of input terminals 10 and 11 to which a suitable RF input is connected. Terminals 10 and 11 are connected to opposite ends of the primary 12 of a transformer $T_1$. Secondary 13 of the transformer $T_1$ has one side connected to a resistor $R_1$ and the other side connected to the emitter 14 of transistor $Q_1$. The collector 16 of transistor $Q_1$ is connected to ground. The base 17 of transistor $Q_1$ is connected to an input terminal 18 through resistor $R_2$. A pair of Zener diodes $CR_1$ and $CR_2$ are connected back to back between the emitter 14 of transistor $Q_1$ and the resistor $R_1$. A condenser $C_1$ is connected between one side of resistor $R_1$ and ground. An output terminal 19 is connected to the ungrounded side of condenser $C_1$.

The signals whose phases are to be compared are supplied to input terminals 10 and 11 (an RF signal) and a trigger pulse T, to terminal 18.

In operation, the phase detector of FIGURE 1 possesses the advantages of a DC offset of less than 1 millivolt (required saturation voltage of transistor $Q_1$), detection efficiency in excess of 90 percent, bandwidth as narrow as 0.001 c.p.s., relative freedom from offset due to saturation, and high reliability through simplicity of circuit and operation. The detector as shown is basically a sampler—the efficiency and output impedance of which are inversely proportional to the duty factor of sampling.

Figure 2:
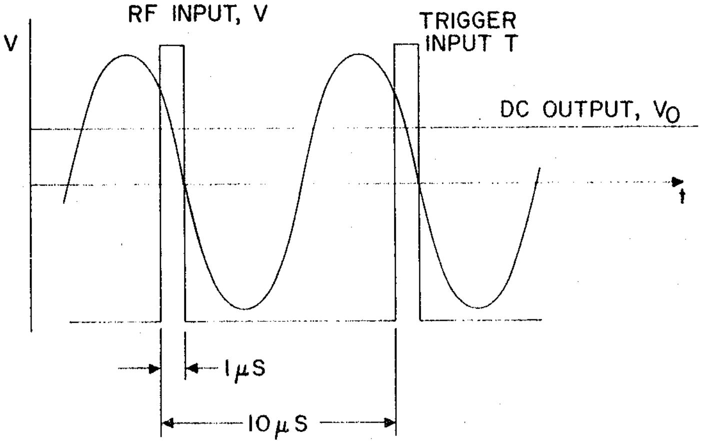
FIGURE 2 is a timing diagram.

Operation of the detector can be seen from the schematic of FIGURE 1 and the timing diagram of FIGURE 2. During each cycle (or during selected cycles) of the RF input, a trigger input, T, drives the planar transistor $Q_1$ to saturation during the positive portion of the trigger cycle. Because of the very low saturation voltage of $Q_1$, this effectively ties the lower end of transformer secondary coil 13 to ground and provides a current path to eventually charge $C_1$ to the instantaneous voltage of the RF input. The time and amplitude relationships between the RF input, trigger input, and DC output voltages for a typical condition are shown in FIGURE 2. Because the trigger occurs during the positive half-cycle of the RF signal, the DC output voltage $V_0$ is positive. Similarly, if the trigger occurs during the negative portion of the RF cycle, the DC output voltage $V_0$ will be negative.

The low-offset, high-efficiency operation of this detector is achieved by taking advantage of the switching parameters of the new diffused silicon planar transistors such as type 2N2217, the 2N2432, and the 2N3153. The 2N3153 was used in a circuit tested because of its higher switching speed.

The feature which makes the detector unique and which provides freedom from saturation is the addition of Zener diodes $CR_1$ and $CR_2$ across the transformer secondary and the series resistor $R_1$. The two Zeners prevent saturation of the detector due to random noise and nonsynchronous interference by clipping the RF input at less than the breakdown voltage of transistor $Q_1$. For example, if $Q_1$ is turned off with its base held six volts below ground potential, a negative-going RF signal of more than six volts amplitude would cause $Q_1$ to turn on and would therefore cause an offset due to overdriving or saturating the detector. Since the Zener voltage of $CR_1$ and $CR_2$ is five volts, the RF input is clipped at five volts peak amplitude, thereby preventing the possibility of exceeding the holdoff voltage or the emitter-to-base reverse-breakdown voltage of $Q_1$.

At first glance, it would appear that any attempt to prevent saturation by intentionally clipping the input signal would result in a very poorly designed detector circuit. Instead, Zener diodes $CR_1$ and $CR_2$ have no effect on the linearity of the circuit even when the RF interference amplitude exceeds the Zener voltage many times over. The truth of this statement is apparent when it is seen that the voltage across the Zener diodes during the sampling period is only equal to the emitter-to-collector saturation voltage of $Q_1$ plus the DC signal stored on capacitor $C_1$. Since saturation voltage of $Q_1$ is less than one millivolt, the voltage across the Zeners is essentially equal to the stored signal voltage.

The stored signal voltage is equal to the coherent RF signal amplitude plus the random or nonsynchronous variation caused by the interference. This variation is small since the effective post-detection bandwidth of the detector is equal to the sampling duty factor divided by the product, $R_1C_1$. In a circuit tested, the bandwidth was 3.2 c.p.s. at 100 k.c.p.s. In cases where only selected cycles are sampled, the bandwidth can be much narrower.

This detector achieves wide dynamic range with no sacrifice in linearity, resolution, stability, or reliability. Its use will be especially desirable in quadrature phase detector applications where the detected signal is normally nulled at zero.

It is seen that this invention provides an improved phase detector and although it has been described with respect to particular embodiments thereof, it is not to be so limited, as changes and modifications may be made therein which are within the spirit and scope of the invention as defined by the appended claims.

I claim:

1. A phase detector comprising a pair of input terminals connected across a primary of a transformer, a resistor connected to a first side of the secondary of said transformer, a pair of diodes connected back to back between the second side of said secondary of the transformer, and the resistor, a transistor with one electrode connected to the second side of the secondary of the transformer, a second electrode of the transistor connected to ground, a third electrode of the transistor connected to a third input terminal, a condenser connected between ground and the resistor, and an output terminal connected to the ungrounded side of the condenser.

2. A phase detector comprising a pair of input terminals connected across a primary of a transformer, a resistor connected to a first side of the secondary of said transformer, a pair of Zener diodes connected back to back between the second side of said secondary of the transformer and to the resistor, a planar transistor with one electrode connected to the second side of the transformer, a second electrode of the planar transistor connected to ground, a third electrode of the planar transistor connected to a third input terminal, a condenser connected between ground and the resistor, and an output terminal connected to the ungrounded side of the condenser.

References Cited

UNITED STATES PATENTS

| | | | | |
|---|---|---|---|---|
| 2,892,940 | 6/1959 | Ogletree | 328—146 | |
| 2,903,508 | 9/1959 | Hathway | 324—83 | X |
| 3,068,407 | 12/1962 | Altman | 324—83 | X |
| 3,193,702 | 7/1965 | Claessen | 307—318 | X |
| 3,194,984 | 7/1965 | Cilyo | 307—318 | X |
| 3,298,011 | 1/1967 | Lehnhardt | 328—151 | X |

DONALD D. FORRER, Primary Examiner

B. P. DAVIS, Assistant Examiner

U.S. Cl. X.R.

307—248, 253, 318